Feb. 11, 1941.   J. M. PLASKITT ET AL   2,231,816
LOCOMOTIVE DRIVING WHEEL
Filed Jan. 5, 1940   2 Sheets-Sheet 1
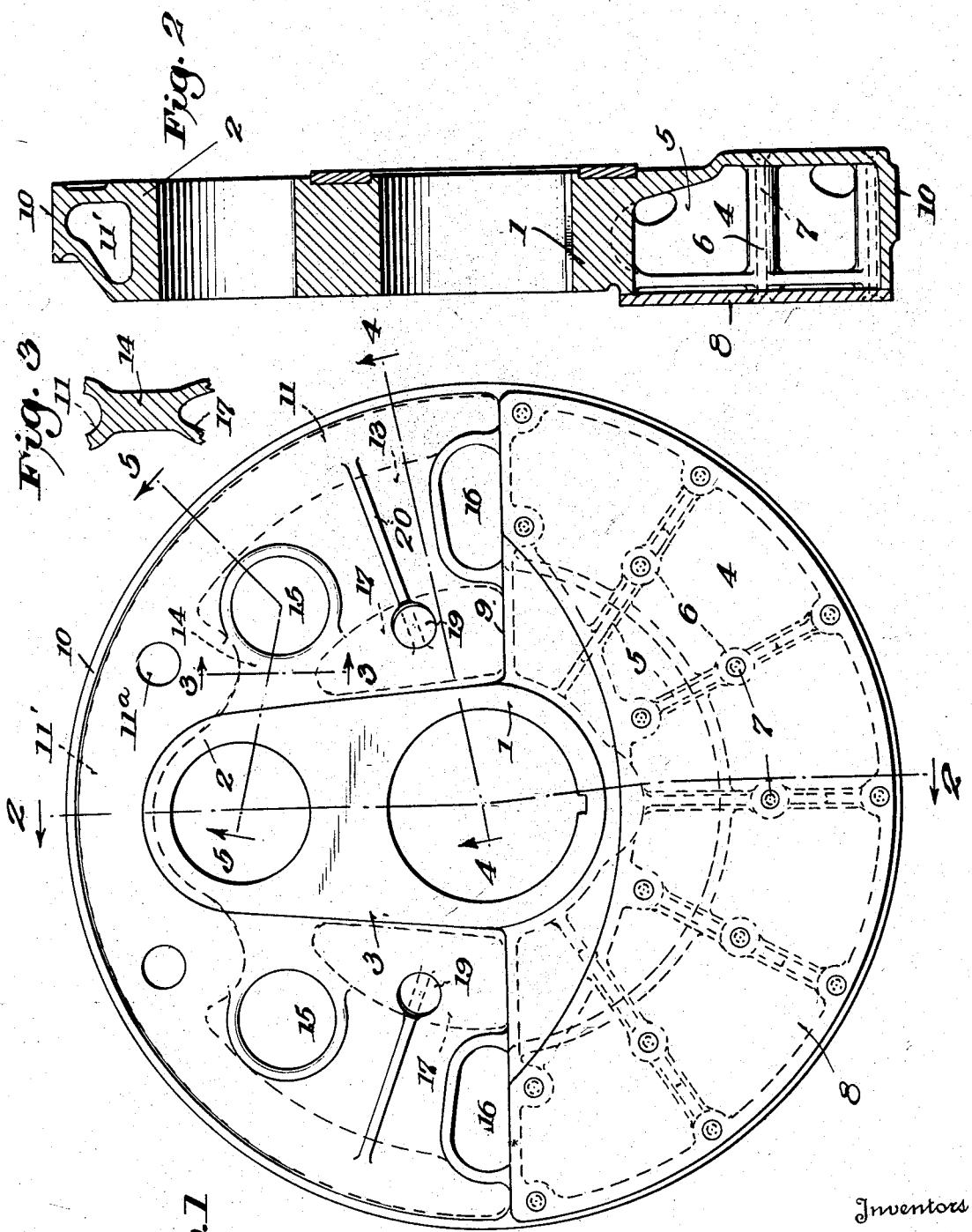
Inventors
James M. Plaskitt,
Luman W. Doggett,
By Stone, Boyden & Mack,
Attorneys.

Feb. 11, 1941. J. M. PLASKITT ET AL 2,231,816
LOCOMOTIVE DRIVING WHEEL
Filed Jan. 5, 1940 2 Sheets-Sheet 2
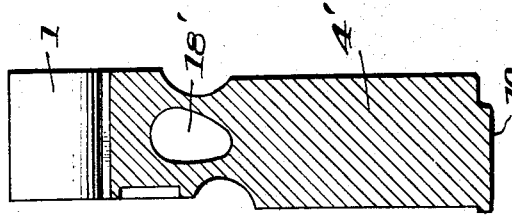
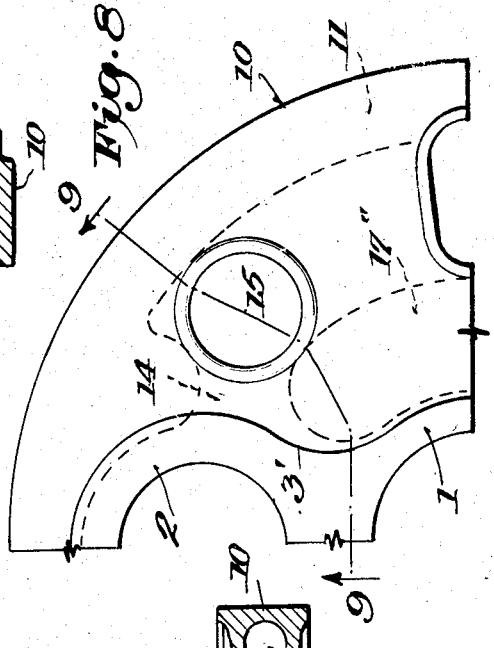
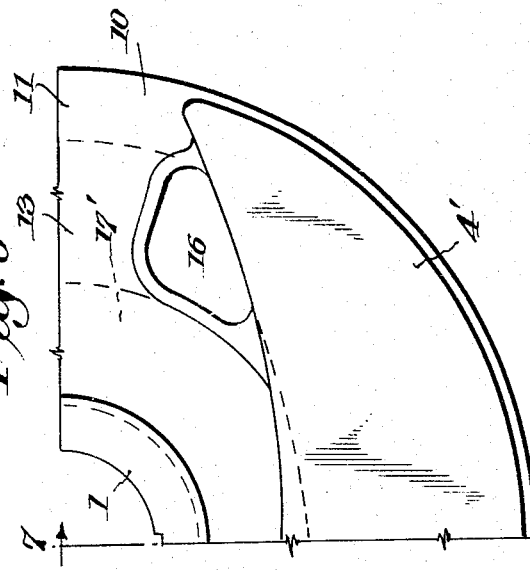
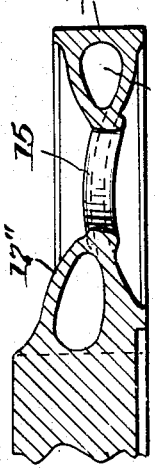
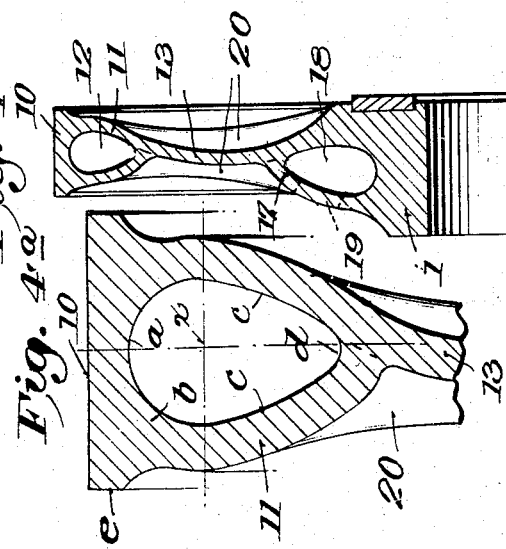
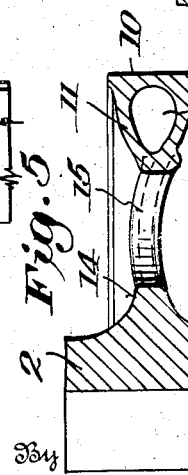
Inventors
James M. Plaskitt,
Linnan W. Doggett,
By Stone, Boyden & Mack,
Attorneys Patented Feb. 11, 1941

2,231,816

UNITED STATES PATENT OFFICE 2,231,816

LOCOMOTIVE DRIVING WHEEL

James M. Plaskitt, Belle Haven, Va., and Luman W. Doggett, Washington, D. C.

Application January 5, 1940, Serial No. 312,594

7 Claims. (Cl. 295—28)

This invention relates to locomotive driving wheels, and more particularly to driving wheels of the semi-disc type.

As is well known, locomotive driving wheels are subjected to severe strains when in operation, and in integral cast wheels, dangerous stresses are unavoidably set up in the hubs by the application, under a press fit, of the axle and crank pin, and furthermore, compression stresses, extending through the entire wheel, are caused by the application of the tire with a shrinkage fit. These stresses, coupled with the strain due to piston thrust, and lateral or flange forces, have often resulted in failure of the wheel, especially in the region of the hubs. In numerous prior driving wheel centers the construction has been such as to allow a concaving inwards or a convexing outwards of the entire center, from the rim to the hub. In many cases this occurs with and also without cracks in rims, spokes and/or hubs. The rims, also, have been a constant source of weakness, due to their tendency to flatten at certain points, under operating conditions.

Because of counterbalancing problems, it is also well recognized that the crank pin side of the wheel should be made as light as possible, consistent with the necessary strength.

An object of the present invention, therefore, is to provide a wheel construction of the type in question in which the parts are so shaped and proportioned as to obviate the possibility of the concaving or convexing above mentioned and to afford the maximum strength to withstand the various forces and stresses referred to, while at the same time effecting a distribution of metal exceptionally favorable to proper counterbalancing.

Another object is to provide a cast wheel of the semi-disc type having the portion adjacent the rim so shaped and constructed as to rigidly support the rim at all points and thus avoid flattening in spots.

With the above and other objects in view, and to improve generally on the details of wheels of the type referred to, the invention consists in the construction, arrangement and combination of parts hereinafter described and claimed, and illustrated in the accompanying drawings, forming part of this specification, and in which:

Fig. 1 is a side elevation of a wheel constructed in accordance with our invention;

Fig. 2 is a transverse section thereof on the line 2—2 of Fig. 1, looking in the direction of the arrows;

Fig. 3 is a fragmentary section substantially on the line 3—3 of Fig. 1, looking in the direction of the arrows;

Fig. 4 is a transverse section substantially on the line 4—4 of Fig. 1, looking in the direction of the arrows;

Fig. 4ª is an enlarged fragmentary view showing the upper portion of Fig. 4;

Fig. 5 is a section substantially on the line 5—5 of Fig. 1, looking in the direction of the arrows;

Fig. 6 is a fragmentary side elevation of a slightly modified construction;

Fig. 7 is a radial section on the line 7—7 of Fig. 6, looking in the direction of the arrows;

Fig. 8 is a fragmentary side elevation of a still further modified construction; and Fig. 9 is a section substantially on the line 9—9 of Fig. 8, looking in the direction of the arrows.

Referring to the drawings in detail, our improved wheel comprises an axle hub 1 and a crank pin hub 2, united or joined by a connecting portion or neck 3, all of these parts constituting a hub structure and being of relatively heavy construction of uniform thickness, as shown in Fig. 2. It will be noted that the sides of the neck portion 3 are substantially tangent to the respective hubs.

At the opposite side of the wheel from the crank pin hub is provided a pocket 4, for receiving counterbalancing material. This pocket is formed by a plurality of radially extending reinforcements or partitions 5, having enlargements 6 through which pass axially extending rivets 7 serving to maintain in position a cover plate 8. At the end of the pocket is a radial wall or partition 9, as shown in Fig. 1.

The wheel is provided with a continuous rim 10, on which the usual flanged tire (not shown) is assembled as by shrinking.

The means connecting the hub structure with the rim, in our improved wheel, comprises first a double wall hollow portion 11, adjacent the rim 10 and extending around at least a part of the inner circumference thereof. An opening 11ª is formed through one of the walls for the escape of vapor, and to enable the core material to be removed, after the wheel is cast. By reference to Figs. 4 and 4ª, it will be seen that this double wall portion 11 encloses a hollow chamber 12, of substantially egg shape in cross section.

Radially inward of the double wall hollow portion 11 is a single or solid web portion 13. This extends substantially from the end wall 9 of the counterbalance pocket, up toward the crank pin hub 2, and is united with the crank pin hub by means of a relatively thick web portion 14, as clearly shown in Figs. 1 and 3.

Suitable openings 15 and 16 are formed through the solid web portion 13, as shown in Fig. 1, the opening 15 being so located as to provide a passage through which the knuckle pin or crosshead wrist pin may be conveniently applied or removed when desired.

Disposed between the solid web portion 13 and hub structure on the one hand, and between the end wall 9 of the counterbalance pocket and the web portion 14 on the other, is a second double wall hollow portion 17. By reference to Fig. 4, it will be seen that the chamber 18 within this double wall portion is also substantially egg shaped in cross section. An opening 19 is formed through one of the walls for the escape of vapor and to enable the core to be removed from the interior of the chamber after the wheel is cast. The solid web portion 13 is preferably reinforced and strengthened on each side by means of radial ribs 20, which extend to and merge at their ends into the respective double wall portions 11 and 17.

In wheels where the crank pin hub merges with the wheel rim, the double wall hollow portion 11 merely merges with the crank pin hub. In wheels of the type illustrated in the drawings, however, where the crank pin hub is spaced from the wheel rim, the two are connected by means of a double wall hollow portion 11', as shown in Fig. 2, this portion being a condensation of the portion 11.

The heavy web portion 14 which connects the hub structure with the solid web portion 13 affords extra strength at a point where it is especially needed, and serves to withstand the strains incident to piston thrust. The double wall hollow portion 17, on the other hand, lend lateral strength and stiffness to the wheel, and serve to reinforce the hub structure at a point where failures have heretofore frequently occurred.

The employment of a hollow portion adjacent the rim, which will for brevity, be referred to as substantially egg-shaped in cross section, as shown in Figs. 4 and 4ª, is particularly advantageous in resisting the strains to which this portion of the wheel is subjected, and in strengthening the wheel structure at this point. Referring to Fig. 4ª, it will be seen that all portions of the walls around the chamber 12 are curved. The side portions c are preferably segments of a curve approaching a parabola having its principal axis disposed radially of the wheel, as indicated by the vertical broken line in Fig. 4ª, or they may be true circular arcs. Merging with the upper ends of the curved portions c is an outer end portion a constituting a true circular arc, forming a perfect arch and providing thickened portions b adjacent each edge of the rim, and this serves to effectively support the rim and prevent flattening thereof in spots, as has heretofore been common. Merging with and connecting the lower ends of the parabolic portions c is an inner end portion d, of smaller radius than the portion a, and also preferably conforming with a true circular arc. The walls 11 at this inner or small end d of the section merge into the single or solid web portion 13. The thickness of the walls at c is preferably substantially the same as at a, at the tread portion of the rim, and is also preferably approximately the same as the thickness of the edge portion of the rim at e. The so-called egg-shaped hollow structure above described has a high section modulus, and its center of gravity lies approximately at the point x, nearly half its length from the large end. This affords a more even distribution of stresses and exceptional rigidity and strength, both laterally and radially, and constitutes one of the important features of the invention.

Figs. 6 and 7 illustrate a wheel structure in which the counterbalance 4' is cast solid with the rest of the wheel. In this structure, also, however, we utilize the circumferential double wall hollow portion 11, the solid web portion 13 and an inner double wall hollow portion 17' extending around a portion of the axle hub 1, and enclosing a chamber 18', also substantially egg-shaped in cross section.

In Figs. 8 and 9, we have illustrated a structure in which the neck 3' between the hubs 1 and 2 is somewhat reduced, and in this case the double wall hollow portion 17" conforms in general to the shape of this reduced neck. The other parts of the wheel are the same as illustrated in Figs. 1 to 5.

It will of course be understood that various changes may be made in the details of construction, arrangement and proportion of parts, without departing from the spirit of the invention as above set forth and as defined in the appended claims.

What we claim is:

1. A locomotive driving wheel of the semi-disc type having a hub structure including axle and crank pin hubs joined by the usual neck, a rim, and means connecting said rim and hub structure and comprising a double wall hollow portion extending around at least a part of the inner circumference of said rim, a relatively wide solid web portion radially inward of said hollow portion and having, adjacent said crank pin hub, a knuckle pin opening, and a second relatively short, solid web portion uniting the margin of said opening directly with the side of the crank pin hub.

2. A locomotive driving wheel of the semi-disc type having a hub structure including axle and crank pin hubs joined by the usual neck, a rim, and means connecting said rim and hub structure and comprising a double wall hollow portion extending around at least a part of the inner circumference of said rim, a solid web portion radially inward of said hollow portion and having a knuckle pin opening therethrough, a second double wall, hollow portion located between said solid web portion and said hub structure, and a second solid web portion joining the margin of said opening with the side of said crank pin hub and entirely separating said second hollow portion from the first.

3. A locomotive driving wheel of the semi-disc type having axle and crank pin hubs, a rim, a counterbalance pocket, and means connecting said rim and hubs and comprising a double wall, hollow portion extending around at least a part of the inner circumference of said rim, a solid web portion radially inward of said hollow portion and joined at one end to the end of said counterbalance pocket, and at the other end directly to said crank pin hub, and a second double wall portion, entirely separated from the first, disposed between said solid web portion and said axle hub, and extending from said counterbalance pocket toward said crank pin hub.

4. A locomotive driving wheel of the semi-disc type having axle and crank pin hubs, a rim, and means connecting said rim and hubs and comprising a double wall, hollow portion extending around at least a part of the inner circumference of said rim, a solid web portion radially inward of said hollow portion, said double wall hollow portion having a substantially egg-shaped transverse section, the outer end adjacent the rim being shaped to form a perfect arch and relatively large, the inner end being arcuate but relatively small and merging into the said solid web portion, and the sides being tangent to the inner ends of said arch.

5. A locomotive driving wheel of the semi-disc type having a hub structure and a rim, and means connecting the rim and hub structure and comprising a double wall, hollow portion extending around at least a part of the inner circumference of the rim, and a solid web portion radially inward thereof, said double wall, hollow portion being of curved, substantially egg-shaped cross section, with the large end of the egg forming a perfect arch and disposed outermost, adjacent the rim and the sides forming curves approaching a parabola tangent to said arch.

6. A locomotive driving wheel of the semi-disc type having a hub structure and a rim, and means connecting the rim and hub structure and comprising a double wall, hollow portion extending around at least a part of the inner circumference of the rim, and a solid web portion radially inward thereof, said double wall portion having a hollow section the outer and inner end portions of which are circular arcs of different radii, and the side portions of which comprise substantially parabolic segments merging at their ends with said circular arcs.

7. A locomotive driving wheel as defined in claim 1, in which said second, relatively short solid web portion increases in thickness as it approaches said crank pin hub and merges into the thickness of said hub.

JAMES M. PLASKITT.
LUMAN W. DOGGETT.